Oct. 4, 1960 C. BRAMMING 2,954,888
PLASTIC-JACKETED VACUUM BOTTLE
Filed Sept. 30, 1957 2 Sheets-Sheet 1

INVENTOR.
Carl Bramming
BY
Ooms, McDougall, Williams & Hersh
Attorneys

Oct. 4, 1960  C. BRAMMING  2,954,888
PLASTIC-JACKETED VACUUM BOTTLE
Filed Sept. 30, 1957  2 Sheets-Sheet 2

INVENTOR.
Carl Bramming
BY
Ooms, McDougall, Williams & Hersh
Attorneys

United States Patent Office 2,954,888
Patented Oct. 4, 1960

2,954,888

PLASTIC-JACKETED VACUUM BOTTLE

Carl Bramming, Nashville, Tenn., assignor to Aladdin Industries, Incorporated, Nashville, Tenn., a corporation of Illinois Filed Sept. 30, 1957, Ser. No. 687,070

6 Claims. (Cl. 215—13)

This invention relates to an improved vacuum bottle of the type wherein a double-walled evacuated glass bottle or filler is mounted within a protective jacket. In particular, the present invention relates to certain improved constructions wherein the exterior jacket is molded from plastic and the structure characterized by simplicity and ruggedness.

It is a major object of the present invention to provide, in a plastic-jacketed vacuum bottle, a novel means for supporting the glass filler within the jacket and protecting the tubulation thereof from damage.

Another object of the present invention is to provide a vacuum bottle wherein resilient support means for the glass filler is integrally molded with a portion of the cylindrical side wall of the jacket.

Still another object of the invention is to provide a novel plastic-jacketed vacuum bottle in which support means for the glass filler is integrally formed with a portion of the jacket wall and in which novel closure means are provided for the bottom cover of the jacket, the filler-supporting structure serving also as a locking means to secure the bottom cover against removal.

Other objects and advantages of the invention will be apparent from the following detailed description of certain typical embodiments thereof.

Figure 1:
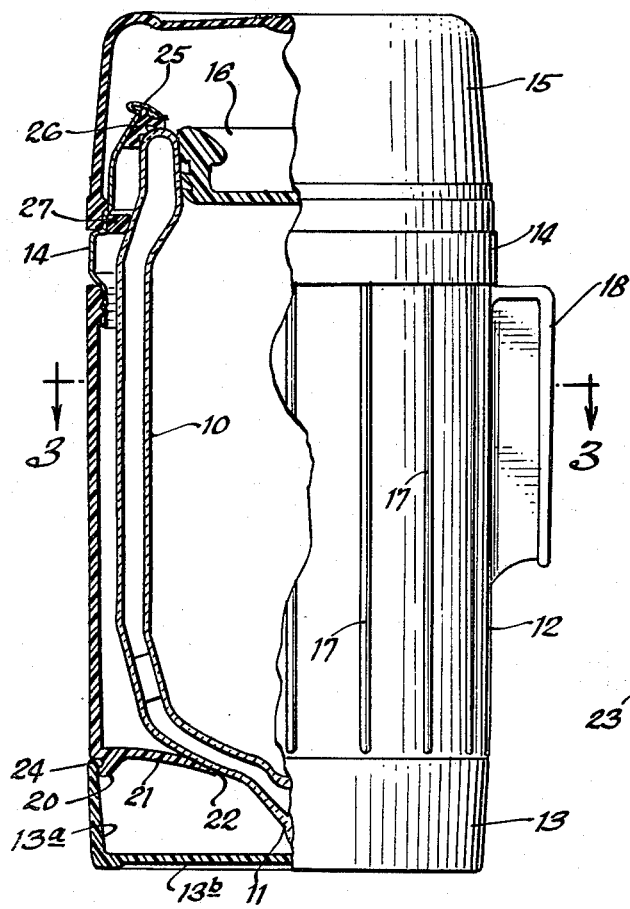
Figure 2:
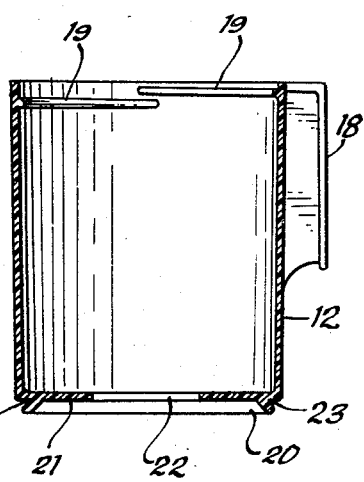
Figure 3:
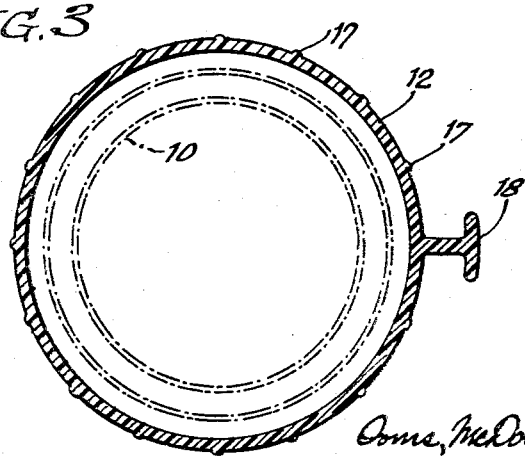
Figure 4:
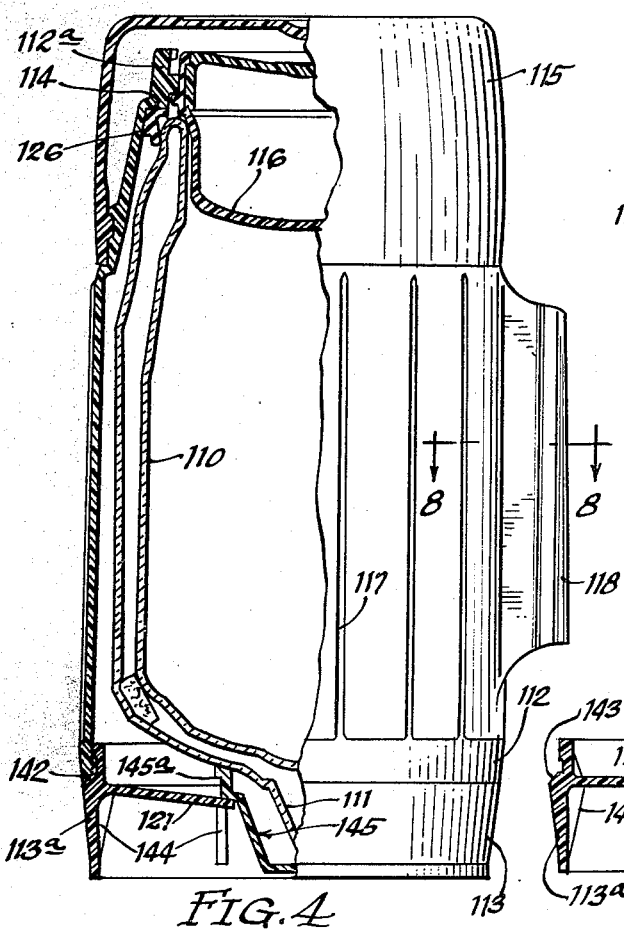
Figure 5:
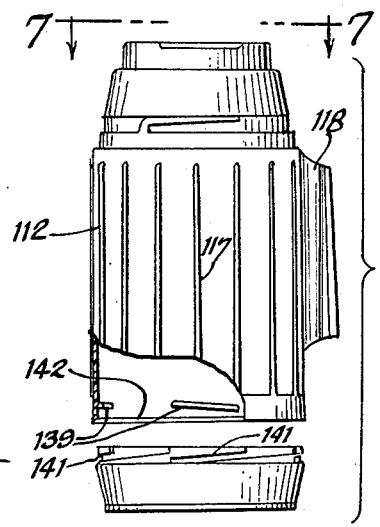
Figure 6:
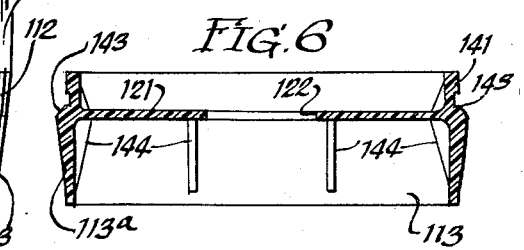
Figure 7:
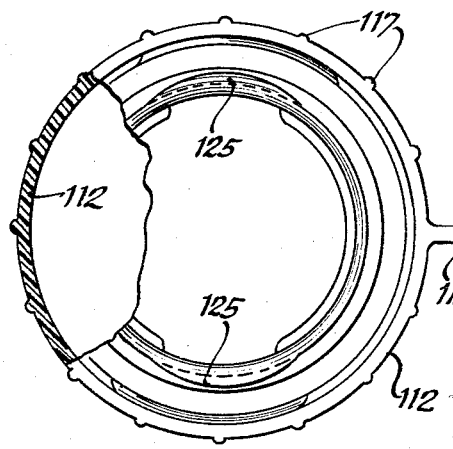
Figure 8:
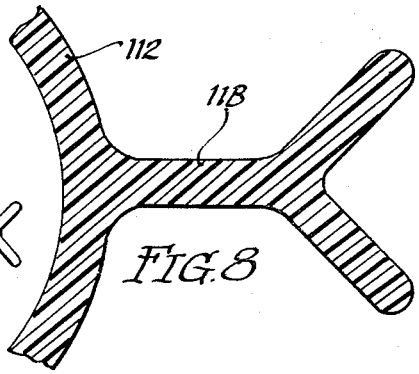

In the appended drawing, Figure 1 is a side elevation view, partly in section, of a typical vacuum bottle embodying the present invention. Fig. 2 is a sectional view in side elevation of the main plastic body section of the Fig. 1 vacuum bottle. Fig. 3 is a transverse sectional view of the Fig. 1 bottle taken along the line 3—3 of Fig. 1. Fig. 4 is a side elevation view, partly in section, of another type of vacuum-bottle construction employing the principles of my invention. Fig. 5 is an exploded view of the two plastic body sections which cooperatively form the jacket of the Fig. 4 bottle, certain parts of the walls being cut away to bring out the manner in which the two sections fit together. Fig. 6 is a sectional view of the bottom portion of the plastic jacket shown in Figs. 4 and 5. Fig. 7 is a plan view, partly cut away, of the top jacket section illustrated in Fig. 5. Fig. 8 is a fragmentary sectional view along the line 8—8 of Fig. 4, bringing out the structure of the molded plastic handle.

Referring now to Fig. 1, I show therein a vacuum bottle employing a conventional double-walled glass filler 10. After filler 10 has been manufactured, the space between its inner and outer walls is evacuated, providing excellent insulation against passage of heat into or out of the interior of the filler. This evacuation step is accomplished through an evacuation tube on the bottom of the filler bottle which, after evacuation, is melted and sealed off, forming a so-called tubulation "tip" 11. As will presently be brought out in detail, one of the most important features of my invention relates to the provision made for supporting the vacuum filler 10 and protecting the tubulation 11 against damage.

In the Fig. 1 embodiment, the outer protective jacket includes a main body portion 12, a bottom section 13, and a neck section 14. Fitted over the neck section 14 is a cap 15. A suitable stopper 16 is provided for closing off the open end of the filler 10.

Of the jacket parts just mentioned, the main body section 12, the bottom section 13, and the cap 15 are preferably molded of a relatively hard plastic material which is somewhat flexible in thin sections. Many plastics having these characteristics are well known and widely used in present-day technology.

The stopper 16 may be made of any suitable material, such as synthetic or natural rubber.

Since the stopper and cap form no part of the present invention, it will suffice to state that these elements may be conventional in structure.

In the illustrated embodiment, the neck portion 14 of the jacket is shown as a metal piece. It should be understood that this showing is illustrative and not limiting, since this piece may also, if desired, be molded from plastic.

The outer surface of the body section 12 may be provided with ribs 17 to facilitate handling, and may also carry a plastic handle 18 integrally molded thereon.

On the inner surface of body section 12, near its upper rim, I provide appropriate molded threads 19 positioned to cooperate with the corresponding threaded surface of neck member 14, which screws into the top of body section 12 in the manner shown in Fig. 1.

Extending inwardly from the inner surface of body section 12 near its lower extremity is a web 21, formed integrally with the side wall of body section 12. Web 21 is annular in conformation, being provided with a central aperture 22 which, in the assembled vacuum bottle, receives the bottom of the filler 10, the tubulation 11 protruding therethrough.

Immediately below the web 21, the body section 12 carries an annular lip 20 extending downward and outward from the base of web 21. The lip 20 and the side wall of body section 12 define between them an annular groove 23.

The bottom jacket section 13 of my vacuum bottle is generally cup-shaped, the side wall 13a having sufficient depth to afford ample clearance between the tubulation tip 11 and the bottom wall 13b when the bottom section 13 has been assembled in the manner presently to be described. Around the inner side of the upper rim of bottom section 13 there is provided an inwardly extending annular tongue 24.

The bottom section 13 is dimensioned in such manner that its outer wall has substantially the same diameter as that of main body section 12, and the tongue 24 is dimensioned to make a snap fit over the lip 20 so as to fit snugly within the groove 23 on body section 12. The slightly flexible character of the plastic material used for body sections 12 and 13 makes it easy to snap these parts together during assembly of the vacuum bottle. As will be explained in a later paragraph, these parts are effectively held against accidental separation by coaction between the filler 10, the web 21, and the lip 20.

The neck portion 14 of the jack is tapered inwardly near its upper rim and is modified to define a pouring lip 25. Lip 25 overlies the upper rim of the glass filler 10 and bears against it through a gasket 26. An additional gasket 27 is provided to insure accurate centering of the filler within the jacket and to provide a secondary seal against leakage of liquids into the space between the filler and the jacket.

As may be seen from Fig. 1, when the neck portion 14 of the jacket is screwed into position within the upper edge of body section 12, the pouring lip 25 and gasket 26 act as a clamping means which clamps the filler 10 between the gasket 26 and the web 21. When the neck section 14 is fully screwed into position, the filler 10 deforms or flexes the web 21 in the manner shown in Fig. 1. This provides for the filler a resilient support which holds it in position while permitting it a slight range of transient movement in response to shock, a type of mounting highly desirable for a brittle and relatively fragile object such as the glass filler.

The deformation or flexing of web 21 by the filler 10 not only provides a resilient support for the filler but, as shown in Fig. 1, strains outwardly the lip 20 and the side wall of body section 12 adjacent thereto, thus clamping tightly into place the bottom section 13, tongue 24 of which is received within the groove 23. This novel action so effectively locks together the jacket sections 12 and 13 as to make them almost impossible of separation once the filler has been clamped into position, whereas they can be easily snapped together and apart when the filler 10 is not within the jacket.

In Figs. 4–8, I show an alternative embodiment of my invention, utilizing the same principles in a slightly different manner. In the structure of Figs. 4–8, I show a vacuum bottle having a main body portion 112, a bottom section 113, a screw-in stopper 116, and a screw-on cap 115. In this embodiment of the invention, the neck section of the jacket is integrally molded with the main body section, the tapered top portion 112a being modified to provide a pair of oppositely disposed pouring lips 125 and having an inwardly extending annular shoulder 114 which, through gasket 126, bears against the upper edge of the filler 110 and assists in clamping the filler in position.

The outer surface of main body portion 112 may be provided with ribs 117 and molded-on handle 118, as shown in the Fig. 1 embodiment. The bottom edge of main body section 112 is, in the Fig. 4 embodiment, molded with screw threads 139 on its inner surface which are adapted to receive and cooperate with corresponding threads 141 on the bottom jacket section 113. The lowermost inner edge of the jacket section 112 is formed as a slanting annular surface 142, which, as will be presently noted, is positioned and adapted to bear against a corresponding annular surface 143 on the outside of jacket section 113.

Jacket section 113, in the embodiment of Figs. 4–8, includes a side-wall section 113a and an inwardly extending annular web 121 molded integrally therewith. The conformation and function of the web 121 is essentially the same as that of the web 21 in the Fig. 1 embodiment of the invention. As shown in Figs. 4 and 6, the inner surface of the side wall 113a may if desired be reinforced with shallow ribs 144 which serve to strengthen and stiffen the side wall 113a without affecting significantly the flexibility of the web 121.

In the Fig. 4 embodiment of the invention, I provide, interposed between the bottom of the filler 110 and the upper surface of the web 121, a tubulation protector 145, which may be made of molded plastic similar to that of which the jacket sections 112 and 113 are formed. Tubulation protector 145 is formed in the shape of a shallow cup, and it has in its upper part an annular zone 145a of increased diameter, providing a shoulder which rests on web 121. As appears from Fig. 4, the bottom of filler 110 rests on the upper rim of the cup 145.

When this embodiment of my invention is being assembled, the filler 110 is inserted through the bottom of the jacket section 112, its upper edge being brought into engagement with the gasket 126. Thereupon, the tubulation protector 145 is placed over the tubulation tip 111, the tubulation protector 145 is fitted within the central aperture 122 in web 121, and the bottom jacket section 113 is thereupon screwed into place in the lower part of jacket section 112.

As the bottom jacket section 113 is brought fully into its screwed-in position, the enlarged-diameter portion 145a of the tubulation protector 145 bears against the web 121, forcing it downward and straining the web and the adjacent portions of the side wall 113a with which it is integrally molded. This action provides a resilient suspension for the filler 110 and at the same time forces the annular surface 143 on bottom jacket section 113 very tightly into engagement with the corresponding surface 142 on the main jacket section 112. Thus, in this embodiment of my invention, the web 121 serves both the support function and the locking function served by the web 21 of the Fig. 1 embodiment.

It will of course be understood that the side wall 113a which is part of the bottom jacket section 113 extends downward sufficiently to clear fully the bottom surface of the tubulation protector 145, so that the assembled vacuum bottle will sit stably and securely on a flat surface.

While this specification has set forth in considerable detail two typical embodiments of my invention, it should be understood that these are intended merely as illustrative embodiments of the invention. Many variations in the structures shown may be made by persons skilled in the art without departing from the scope and spirit of my invention.

I claim:

1. In a vacuum bottle comprising a double-walled evacuated glass filler having a tubulation tip on the bottom surface thereof, the combination with such filler of an outer jacket of generally cylindrical conformation and having a side wall formed at least partly of molded plastic which is flexible in thin sections, said jacket comprising two parts, each of which includes a part of the plastic side wall of said jacket, said parts being adapted to mate together overlappingly in an annular zone, the mating portions of said parts being modified on their adjoining faces to define a strain-actuated locking means, a thin web molded integrally with one of said jacket parts adjacent said overlapping zone, said web extending inwardly from said side wall and being centrally relieved to receive said tubulation tip, clamp means carried by said jacket partially overlying the top part of said filler, said filler in the assembled vacuum bottle being resiliently held between said clamping means and said web, said web under such conditions being flexed, thereby providing resilient support for said filler and straining at least one of said mating portions and thereby actuating said locking means.

2. The combination defined in claim 1 wherein said locking means comprises opposed circumferential ribs on the adjoining faces of said mating portions, the strain produced by said flexed web being operative to increase the frictional engagement between said ribs and thus prevent their accidental separation.

3. In a vacuum bottle comprising an evacuated glass filler, the combination with such filler of an outer jacket of generally cylindrical conformation and having a side wall formed at least partially of molded plastic which is flexible in thin sections, said jacket comprising two parts, each of which includes a part of said plastic side wall, said parts being adapted to mate together overlappingly in an annular zone, the mating portions of said parts being modified on their adjoining faces to define a strain-actuated locking means, a thin web molded integrally with one of said jacket parts adjacent said annular zone, said web extending inwardly from said side wall and being centrally relieved and dimensioned to support the bottom of said filler, said jacket having also clamp means adapted and positioned partially to overlie the top part of said filler, said filler in the assembled vacuum bottle being resiliently clamped between said clamping means and said web, said web being under those conditions subjected to flexure, providing resilient support for said filler and straining at least one of said mating portions and thereby actuating said locking means.

4. In a vacuum bottle having an evacuated glass filler, the combination with such filler of an outer jacket of generally cylindrical conformation, said jacket comprising a main body section and a bottom section, said main body section being integrally molded of a plastic material which is flexible in thin sections, the lower edge of said main body section having an outwardly extending annular lip and having also, adjacent said lip, an inwardly extending flexible web, said web being centrally relieved and dimensioned to support the bottom of said filler, said jacket having also clamping means adapted and positioned to overlie partially the top part of said filler, said filler being in the assembled vacuum bottle clamped between said clamping means and said web, said bottom jacket portion having sufficient depth to receive and provide clearance for the bottom of said filler and having around its upper edge an annular tongue adapted to make a snap fit over said lip, the flexure of said web when said filler is clamped thereabove being operative to strain said lip outwardly and to increase the frictional engagement between said tongue and said lip.

5. In a vacuum bottle comprising an evacuated glass filler, the combination with such filler of an outer jacket of generally cylindrical conformation and having a side wall formed at least partially of molded plastic which is flexible in thin sections, said jacket comprising a body section and a bottom section, each of which includes a part of said plastic side wall, said parts being adapted to mate overlappingly together in an annular zone, the mating portions of said parts being modified on their adjoining faces to define a strain-actuated locking means, a thin web molded integrally with said bottom jacket section, said web extending inwardly from the side wall of said section and being centrally relieved and dimensioned to support the bottom of said filler, clamp means carried by the body section of said jacket adapted and positioned to overlie partially the top part of said filler, said filler in the assembled vacuum bottle being resiliently clamped between said clamping means and said web, said web under those conditions being flexed sufficiently to strain at least one of said mating portions and thereby actuating said locking means.

6. In a vacuum bottle comprising an evacuated glass filler having on its bottom surface a tubulation tip, the combination with such filler of an outer jacket of generally cylindrical conformation and having a side wall formed at least partially of molded plastic which is flexible in thin sections, said jacket comprising a body section and a bottom section, each of which includes a part of said plastic side wall, said parts being adapted to mate overlappingly together in an annular zone, the mating portions of said parts being modified on their adjoining faces to define a strain-actuated locking means, a thin web molded integrally with said bottom jacket section, said web extending inwardly from the side wall of said section and being centrally relieved, a tubulation protector interposed between the bottom of said filler and the top surface of said web, said protector having a cup-like portion extending through the relieved zone of said web and completely surrounding said tubulation tip, the sidewall portion of said bottom jacket section extending below the lowest part of said tubulation protector and defining a planar base for said jacket, and clamp means carried by the body section of said jacket adapted and positioned to overlie partially the top part of said filler, said filler and said tubulation protector in the assembled vacuum bottle being resiliently clamped between said clamping means and said web, said web under those conditions being flexed sufficiently to strain at least one of said mating portions and thereby actuating said locking means.

References Cited in the file of this patent
UNITED STATES PATENTS

| | | |
|---|---|---|
| 2,713,435 | Venis | July 19, 1955 |
| 2,741,387 | Darmstadt et al. | Apr. 10, 1956 |
| 2,756,889 | Bramming | July 31, 1956 |

FOREIGN PATENTS

| | | |
|---|---|---|
| 175,444 | Great Britain | Feb. 23, 1922 |